US009995007B2

(12) United States Patent
Röhr et al.

(10) Patent No.: US 9,995,007 B2
(45) Date of Patent: Jun. 12, 2018

(54) DRIVE SYSTEM, IN PARTICULAR FOR A SELF-PROPELLED CONSTRUCTION MACHINE, IN PARTICULAR A SOIL COMPACTOR

(71) Applicant: Hamm AG, Tirschenreuth (DE)

(72) Inventors: Andreas Röhr, Weiden (DE); Thomas Henker, Tirschenreuth (DE); Ronny Pieske, Zwönitz (DE)

(73) Assignee: Hamm AG, Tirschenteuth, DE (US)

( * ) Notice: Subject to any disclaimer, the term of this patent is extended or adjusted under 35 U.S.C. 154(b) by 278 days.

(21) Appl. No.: 14/573,932

(22) Filed: Dec. 17, 2014

(65) Prior Publication Data
US 2015/0176226 A1      Jun. 25, 2015

(30) Foreign Application Priority Data
Dec. 20, 2013  (DE) .......................... 10 2013 227 032

(51) Int. Cl.
*F15B 1/027* (2006.01)
*F15B 1/033* (2006.01)
(Continued)

(52) U.S. Cl.
CPC ................ *E01C 19/23* (2013.01); *B60K 6/12* (2013.01); *E01C 19/26* (2013.01); *F02B 63/06* (2013.01);
(Continued)

(58) Field of Classification Search
CPC ...... B60K 6/12; B60W 2300/17; E01C 19/23; E01C 19/26; F02B 63/06; F15B 1/024;
(Continued)

(56) References Cited

U.S. PATENT DOCUMENTS 6,082,832 A * 7/2000 Ganzel .................... B60T 8/341
303/119.1
7,231,763 B2 * 6/2007 Suzuki .................... F15B 1/024
60/413
(Continued)

FOREIGN PATENT DOCUMENTS

CN      103261523 A      8/2013
CN      204532652 U      8/2015
(Continued)

OTHER PUBLICATIONS

Electronic Translation of WO 2009132765 A1 to Beck Matthias, Oct. 2009, Germany, pp. 6 and 7.*
(Continued)

*Primary Examiner* — Logan Kraft
(74) *Attorney, Agent, or Firm* — Prince Lobel Tye, LLP

(57) ABSTRACT

A drive system, in particular for a self-propelled construction machine, in particular a soil compactor, comprises a drive unit, at least one hydraulic circuit with a hydraulic pump driven by the drive unit, a hydraulic drive support unit with a hydraulic pump/motor assembly, and at least one pressure fluid reservoir, wherein the hydraulic pump/motor assembly is, or can be, drivingly coupled with the drive unit and/or at least one hydraulic circuit, wherein the hydraulic pump/motor assembly can be operated in a charging operating mode by the drive unit and/or at least one hydraulic circuit as a pump to charge at least one pressure fluid reservoir, and be driven in a drive support operating mode as a motor to provide a drive support torque for the hydraulic pump of at least one hydraulic circuit, characterized in that the hydraulic pump/motor assembly is operated in a recirculation operating mode as a pump to convey fluid out of a fluid reservoir and into a fluid reservoir.

17 Claims, 2 Drawing Sheets

Figure 1:
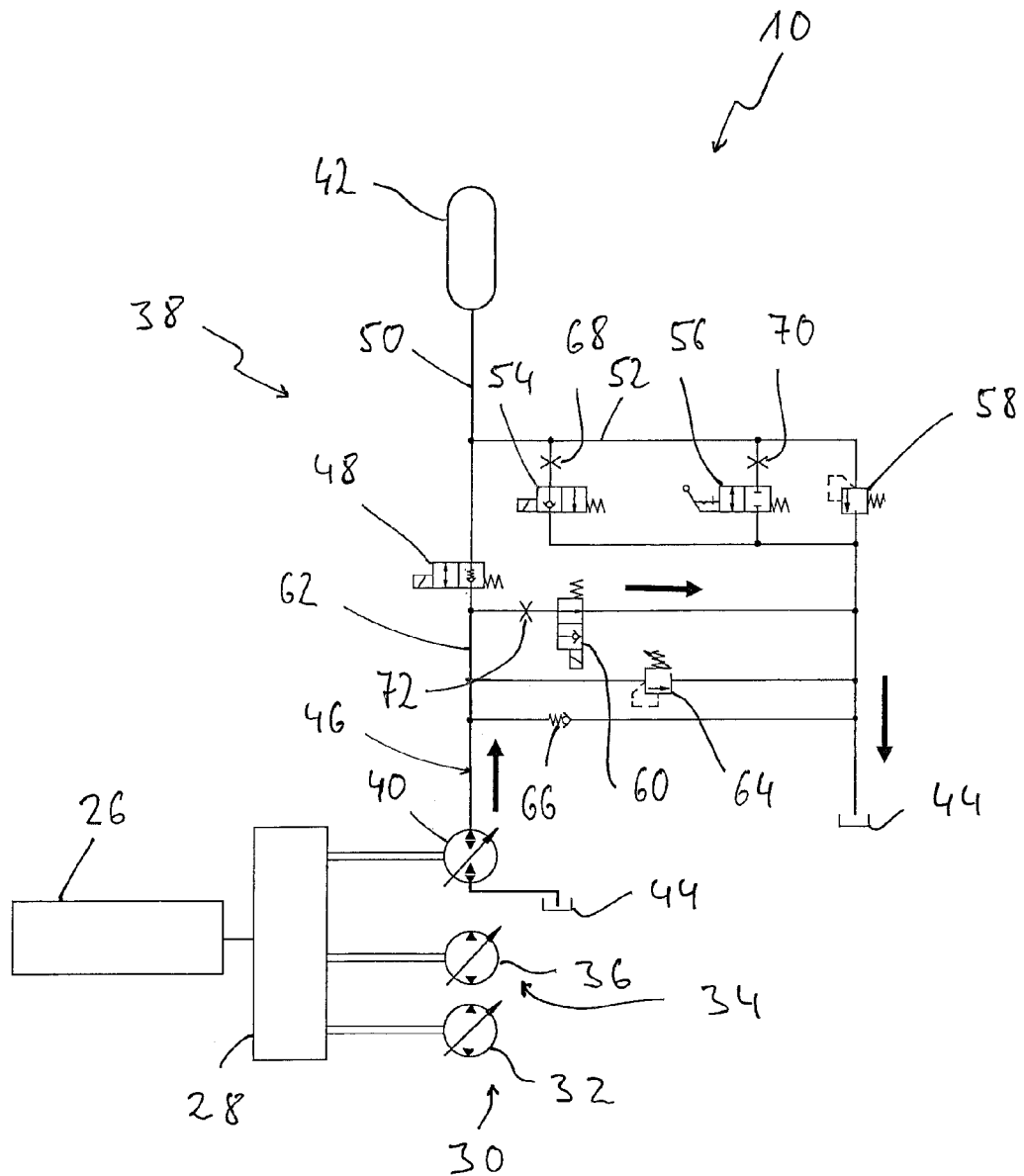

(51) Int. Cl.
F15B 21/14 (2006.01)
F15B 1/02 (2006.01)
E01C 19/23 (2006.01)
E01C 19/26 (2006.01)
F02B 63/06 (2006.01)
B60K 6/12 (2006.01)

(52) U.S. Cl.
CPC .............. *F15B 1/024* (2013.01); *F15B 1/027* (2013.01); *F15B 1/033* (2013.01); *F15B 21/14* (2013.01); *B60W 2300/17* (2013.01); *F15B 2211/50536* (2013.01); *Y02T 10/6208* (2013.01)

(58) Field of Classification Search
CPC .......... F15B 1/027; F15B 1/033; F15B 21/14; F15B 2211/50536; Y02T 10/6208
USPC .................................................. 60/413, 414
See application file for complete search history.

(56) References Cited

U.S. PATENT DOCUMENTS

| | | | | |
|---|---|---|---|---|
| 7,921,936 | B2 * | 4/2011 | Cavanough | E21B 44/04 175/24 |
| 8,186,155 | B2 * | 5/2012 | Rose | B60K 6/12 60/414 |
| 8,511,297 | B2 * | 8/2013 | McNeil-Yeckel | F24J 2/541 126/600 |
| 9,096,115 | B2 * | 8/2015 | Ho | F15B 1/024 |
| 9,334,881 | B2 * | 5/2016 | Tsuruta | B66F 9/22 |
| 2009/0000290 | A1 | 1/2009 | Brinkman | |
| 2010/0300085 | A1 * | 12/2010 | Schmuttermair | B60K 6/12 60/414 |
| 2011/0302913 | A1 * | 12/2011 | Mueller | B60K 6/12 60/413 |
| 2013/0025385 | A1 | 1/2013 | Renz et al. | |
| 2013/0111890 | A1 * | 5/2013 | Rosth | B66F 9/22 60/327 |
| 2013/0266373 | A1 | 10/2013 | Pieske et al. | |

FOREIGN PATENT DOCUMENTS

| | | | |
|---|---|---|---|
| DE | 195 14 985 A1 | 10/1996 | |
| DE | 10 2010 006 993 A1 | 8/2011 | |
| DE | 10 2010 063 255 A1 | 6/2012 | |
| DE | 10 2011 104919 A1 | 10/2012 | |
| EP | 1 935 697 A1 | 6/2008 | |
| JP | H04-219502 A | 8/1992 | |
| JP | 2010-121373 A | 6/2010 | |
| JP | 2010-121726 A | 6/2010 | |
| WO | WO 2009132765 A1 * | 11/2009 | ............... B60K 6/12 |
| WO | 2013/074164 A1 | 5/2013 | |

OTHER PUBLICATIONS

Search Report issued for German patent application No. 10 2013 227 032.1 dated Oct. 8, 2014, with machine English translation, 13 pages.

Office Action issued for Japanese Patent Application No. 2014-244737 dated Oct. 19, 2015, with machine English translation (12 pages).

Office Action and Search Report issued for Chinese Patent Application No. 201410789472.X dated Mar. 25, 2016 (7 pages).

Search Report issued for European patent application No. 14193124.6 dated Jun. 16, 2015 with machine English translation (12 pages).

* cited by examiner

DRIVE SYSTEM, IN PARTICULAR FOR A SELF-PROPELLED CONSTRUCTION MACHINE, IN PARTICULAR A SOIL COMPACTOR

CROSS REFERENCE TO RELATED APPLICATION(S)

This application claims priority to German Application No. 10 2013 227 032.1, filed Dec. 20, 2013. The entirety of the disclosure of the above-referenced application is incorporated herein by reference.

BACKGROUND OF THE INVENTION

Field of the Invention

The present invention relates to a drive system, in particular for a self-propelled construction machine, in particular a soil compactor, including:
a drive unit
at least one hydraulic circuit with a hydraulic pump driven by the drive unit,
a hydraulic drive support unit with a hydraulic pump/motor assembly and at least one pressure fluid reservoir, wherein the hydraulic pump/motor assembly is, or can be, drivingly coupled with the drive unit and/or at least one hydraulic circuit, wherein the hydraulic pump/motor assembly can be driven in a charge operating mode by the drive unit and/or at least one hydraulic circuit as a pump to charge at least one pressure fluid reservoir, and be driven in a drive support operating mode as a motor to provide a drive support torque for the hydraulic pump of at least one hydraulic circuit.

Background of the Related Art

Such a drive system has been known from WO 2013/074164A1 as a drive system of a construction machine built as a wheel loader. In this known drive system a drive unit is drivingly coupled with various hydraulic circuits via a gear arrangement. The hydraulic circuits comprise a hydraulic driving circuit with a hydraulic driving pump driven by the drive unit and a hydraulic drive motor driven by the flowing fluid to drive the drive wheels of the wheel loader on operation of the hydraulic driving pump. In addition, one or several hydraulic working circuits are provided. These also comprise a hydraulic working pump driven by the drive unit via the gear arrangement. By means of the hydraulic pressure generated by these pumps, piston/cylinder units can be activated, in order to move a bucket on operation of the wheel loader. This drive system further comprises a hydraulic support unit. It comprises a hydraulic pump/motor assembly driven by the drive unit via the gear arrangement which loads a pressure fluid reservoir when the pump is operated, namely it increases the pressure of the fluid stored therein. The hydraulic pump/motor assembly of this hydraulic drive support unit can also be driven as a hydraulic motor in order to generate a torque on expansion of the pressure in the pressure fluid reservoir which can be conveyed via the gear arrangement to the various hydraulic circuits, namely to the hydraulic driving circuit and the hydraulic working circuit(s). The hydraulic drive support unit can thus provide a drive support torque.

SUMMARY OF THE INVENTION

It is the object of the present invention to provide a drive system, in particular for a self-propelled construction machine, in particular a soil compactor, which prevents an excessive load on a hydraulic drive support unit by efficiently using the available energy sources, [namely the] drive unit and [the] hydraulic drive support unit.

This object is achieved according to the present invention by a drive system, in particular for a self-propelled construction machine, in particular a soil compactor, including:
a drive unit
at least one hydraulic circuit with a hydraulic pump driven by the drive unit;
a hydraulic-drive support unit with a hydraulic pump/motor assembly and at least one pressure fluid reservoir, wherein the hydraulic pump motor assembly is coupled, or can be, drivingly coupled with the drive unit and for at least one hydraulic circuit, wherein the hydraulic pump/motor assembly can be operated in a charge operating mode by the drive unit and/or at least one hydraulic circuit as a pump to load at least one pressure fluid reservoir, and operated in a drive support operating mode as a motor to provide a drive support torque for the hydraulic pump of at least one hydraulic circuit.

It is further provided that the hydraulic pump/motor assembly can be operated in a recirculation operating mode as a pump to convey fluid from one fluid reservoir to another fluid reservoir.

With a drive system constructed according to the present invention, it can be ensured that, as a result of providing a recirculation operating mode, fluid flows through the hydraulic pump/motor assembly, which dissipates heat from the area of the hydraulic pump motor assembly without, for example, changing the charging mode of a pressure fluid reservoir. Thus, overheating of this assembly can be prevented, in particular when it is permanently coupled to a gear arrangement, allowing this hydraulic pump/motor assembly to be operated for a longer period of time, namely driven for rotation, when not required for the conveying fluid.

In this recirculation operating mode, the hydraulic pump/motor assembly is advantageously driven by the drive unit.

The operation of the hydraulic pump/motor assembly in the recirculation operating mode can be especially advantageous and required, for example, when the charging mode of at least one pressure fluid reservoir is above a threshold charge and/or a drive speed of the drive unit is below a threshold speed. Advantageously, these two conditions can be simultaneously met in order to switch the hydraulic pump/motor assembly to the recirculation operating mode. Thus, an excessive load on the drive unit running in this mode with a comparatively low drive torque can in particular be prevented when, for example, the drive unit of the drive system is set to the idle mode, namely a mode at a comparatively low speed, because a working operation is temporarily not required, since the hydraulic pump/motor assembly is only operated to recirculate fluid and only a comparatively low torque is required from the drive unit for this purpose.

It can, for example, be provided, that the threshold charge is a charging mode with a charge in the range of 60 to 80%, preferably about 70%, a maximum charge of the at least one pressure reservoir, and/or that the threshold speed is a speed in the range of 1000 to 1200 revolutions per minute, preferably about 1100 revolutions per minute.

In order to provide, on the one hand, the drive system according to the present invention with the fluid flow connection of the at least one pressure fluid reservoir to the hydraulic pump/motor assembly in a simple manner, and, on the other hand, with a fluid reservoir, it is proposed that the hydraulic drive support unit comprises a charge/discharge valve unit to selectively release/interrupt a flow connection between the hydraulic pump/motor assembly and at least one pressure fluid reservoir at least in the flow direction from the pressure fluid reservoir to the hydraulic pump/motor assembly and an expansion valve unit to selectively release/interrupt a flow connection between at least one pressure fluid reservoir and a fluid reservoir at least in the flow direction from the pressure fluid reservoir to the fluid reservoir.

For safety reasons, it is advantageously provided that the charging/discharging valve is pre-tensioned to the basic state interrupting the flow connection and/or that the expansion valve unit is pre-tensioned to the basic state releasing the flow connection.

In order to regulate the recirculation operating mode in a circuit of this kind in a simple manner, it is proposed that the hydraulic drive support unit comprises a recirculation valve unit in the flow path between the hydraulic pump/motor assembly and a fluid reservoir to selectively release/interrupt a flow connection between the hydraulic pump/motor assembly and the fluid reservoir at least in the flow direction of the hydraulic pump/motor assembly to the fluid reservoir.

In order to ensure that only a restricted fluid flow is conveyed in the direction of the fluid reservoir in the recirculation operating mode, it is proposed that a flow restriction arrangement is provided, in the flow path between the hydraulic pump/motor assembly and a fluid reservoir, preferably in the flow path between the hydraulic pump/motor assembly and the recirculation valve unit.

To increase the operational safety, it can also be provided in association with the recirculation valve unit that it is pre-tensioned to the basic state releasing the flow connection between the hydraulic pump/motor and a fluid reservoir.

In a constructively simple embodiment, the hydraulic drive support unit can comprise an open circuit. It can furthermore advantageously be provided that between at least one fluid circuit, preferentially each fluid circuit, and the hydraulic drive support unit there is no fluid exchange connection. Thus one or several fluid circuits can be constructed as closed high pressure circuits in the hydraulic drive support unit without a corresponding structural requirement.

The drive unit advantageously comprises a diesel combustion engine which can provide a comparatively large drive torque with a comparatively small cylinder capacity and in addition, guarantees efficient fuel consumption.

The invention also relates to a self-propelled construction machine, in particular a soil compactor, comprising a drive system constructed according to the present invention, in which the assemblies or design variants discussed above can be provided individually or in any combination with one another.

Furthermore, the present invention relates to a procedure to operate a drive system, in particular for a self-propelled construction machine, in particular a soil compactor, the drive system comprising a drive unit, at least one hydraulic circuit with a hydraulic pump driven by the drive unit, a hydraulic drive support unit with a hydraulic pump/motor assembly and at least one pressure fluid reservoir, wherein the hydraulic pump/motor assembly and/or at least one hydraulic circuit is, or can be, drivingly coupled, wherein the hydraulic pump/motor assembly can be operated in a charge operating mode by the drive unit and/or at least one hydraulic circuit as a pump to charge a least one pressure fluid reservoir, and in a drive support operating mode as a motor for providing a drive support torque for the hydraulic pump of at least one hydraulic circuit, in which procedure the hydraulic pump/motor assembly is operated in a recirculation operating mode as a pump to convey fluid from a fluid reservoir to a fluid reservoir.

The hydraulic pump/motor assembly can, on the one hand, be operated in the recirculation operating mode to reduce the torque requested by the drive unit on the one hand, and, on the other hand, to prevent overheating thereof, when the charging mode of at least one pressure fluid reservoir is above a predetermined threshold charge and/or the speed of the drive unit is below a predetermined threshold speed.

In order to prevent a too-frequent transition to the recirculation operating mode, when, for example, the speed of the drive unit is pressed below the threshold speed for a short time due to a short-term strong load, it is proposed that the hydraulic pump motor assembly is operated for a predetermined time after falling below the threshold speed to provide the recirculation operating mode, when the charge mode of at least one pressure reservoir is above the predetermined threshold charge. If the speed of the drive unit again increases above the threshold speed within this predetermined time, a transition to the recirculation operating mode can be stopped.

BRIEF DESCRIPTION OF THE DRAWING FIGURES

The invention will be described in detail below with reference to the enclosed figures.

Figure 2:
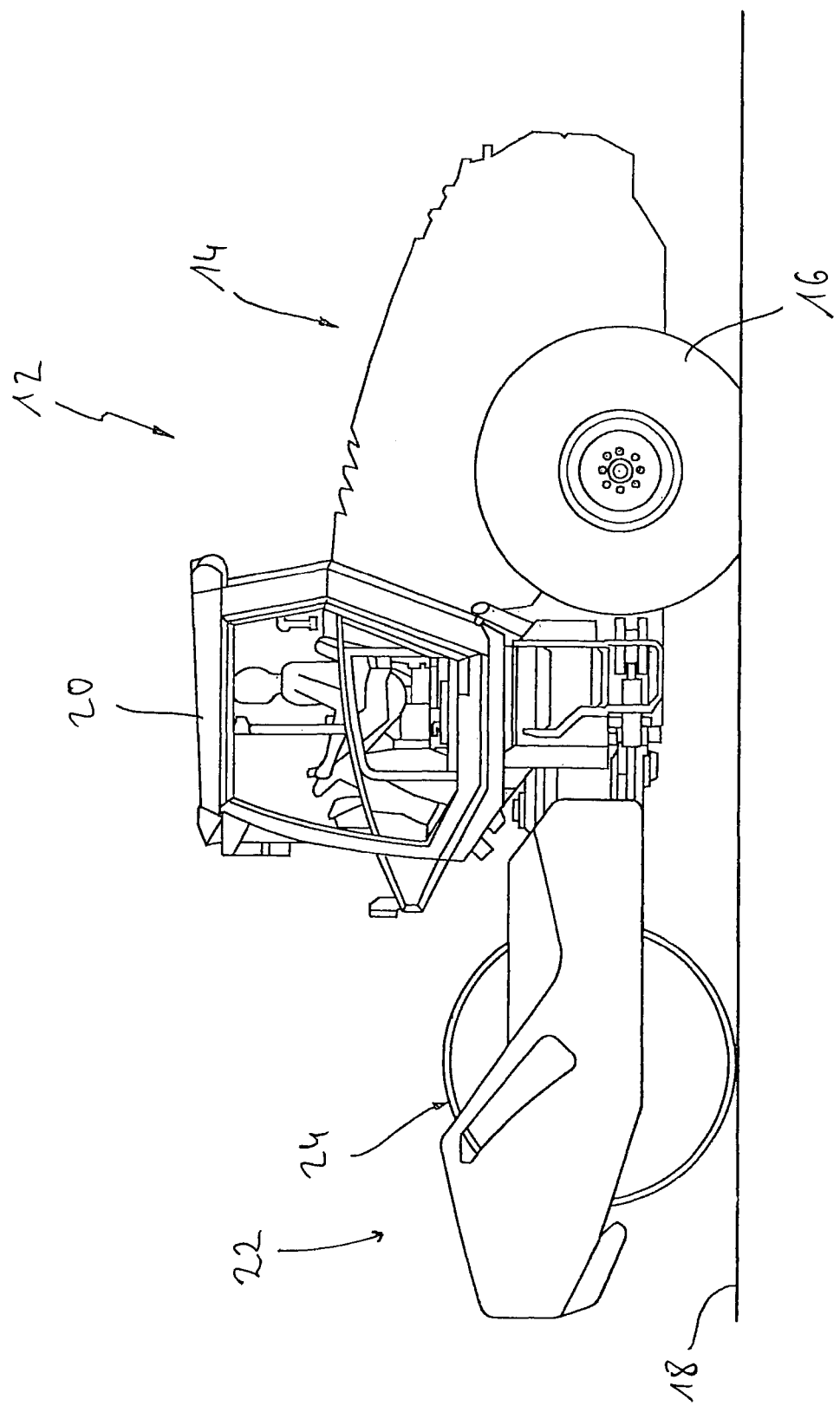

Shown are:

FIG. 1: illustration of the basic construction of a drive system for a self-propelled construction machine;

FIG. 2: a construction machine configured as a self-propelled soil compactor in which the drive system of FIG. 1 is used.

Before a drive system 10 according to the present invention is explained in detail below with reference to FIG. 1, the basic design of a construction machine 12 will first be explained with reference to FIG. 2, into which the drive system of FIG. 1 can be integrated. This construction machine 10 comprises drive wheels 16 on a rear end 14 which can be driven by the drive system 10 for moving the construction machine 12, configured as a soil compactor, forward on the subsoil 18 to be compacted. A driver's cabin 20 is also provided on the rear end 14 in which the person driving the construction machine 12 is accommodated and from which the various functionalities of the construction machine 12 can be controlled.

DETAILED DESCRIPTION OF THE PREFERRED EMBODIMENTS

A compactor roller 24 is provided on the front end 22 articulately connected to the rear end 14 to drive the construction machine 12 configured as a soil compactor. The subsoil 18 on which the construction machine 12 moves is compacted with this compactor roller 24. In order to perform this compacting procedure in a defined manner, an imbalance mass arrangement is associated with the compactor roller 24 which can be accommodated, for example, in the interior of the compactor roller 24 and can be operated to produce a vibratory movement, namely a periodic up-and-down movement of the compactor roller 24, and/or to produce an oscillation movement namely a back-and-forth movement of the compactor roller in the circumferential direction. For this purpose, the drive system 10 depicted in FIG. 1 can be also be used, as will be explained below.

It should be pointed out that the construction machine 12 shown in FIG. 2 in the form of a soil compactor is only shown with regard to its essential aspects and only as an example of a machine in which the drive system 10 of FIG. 1 can be used. For example, in the embodiment as a soil compactor, it could be equipped with an additional compactor roller to be driven for rotation, for example, to advance the soil compactor by means of the drive system 10 of FIG. 1 instead of the drive wheels 16. The construction machine 12 could also be configured in the form of a wheel loader, a bulldozer, an excavator or the like.

The drive system 10 of FIG. 1 comprises a drive unit 26 configured, for example as a diesel combustion engine as the main energy source. This drive unit 26 is, or can be, drivingly coupled with a gear arrangement 28, for example, via a coupling arrangement, a hydrodynamic torque converter or the like. The drive torque provided by the drive unit 26 can be transmitted or distributed to various system areas via the gear arrangement 28.

One of these system areas comprises a hydraulic driving circuit 30 with a hydraulic driving pump 32 integrated therein. Said hydraulic driving pump can be permanently coupled with the gear arrangement 28, or be coupled with the gear arrangement 28, for example, via a coupling arrangement. When the hydraulic driving pump 32 is driven, it recirculates fluid, e.g. hydraulic oil, in the hydraulic driving circuit 30, as a result of which a hydraulic drive motor or several hydraulic drive motors, not shown in FIG. 1, are driven so that a torque can be transmitted, for example, to the drive wheels 16 of the construction machine 12. It should be pointed out in this connection that an independently constructed and operating hydraulic, driving circuit can be provided in association with each drive wheel 16, or, for example, in association with each crawler track of a construction machine.

Reference numeral 34 designates an additional hydraulic circuit, namely a hydraulic working circuit, which also comprises a hydraulic pump, in this case, a hydraulic working pump 36. This hydraulic working pump 36 can also be permanently coupled with a gear arrangement 28 or, for example, to the gear arrangement 28 via a coupling arrangement. When operating, the hydraulic working pump 36 produces a fluid recirculation, e.g. of hydraulic oil in the hydraulic work circuit 34. One or more hydraulic working motors can also be provided in the hydraulic working circuit 34 by means of which, for example, the imbalance mass arrangement can be driven in the compactor roller 24.

It should be pointed out that the hydraulic pumps 32, 36 can be advantageously configured with variable supply volumes, for example, as swashplate pumps in order to regulate the fluid recirculation in the hydraulic circuits configured as high pressure circuits 30, 34 in this way, and thus also the torque that can be transmitted therein.

The drive system 10 also comprises a hydraulic drive support unit in general designated with 38 comprising a hydraulic pump/motor assembly 40 which can be permanently coupled with the gear arrangement 28, or be coupled, or be able to be coupled, with the gear arrangement 28, for example, via a coupling arrangement, and in this manner with the gear arrangement 28, and via this [gear arrangement 28] be drivingly coupled with the drive unit 26 or the hydraulic circuits 30, 34, in particular, their hydraulic pumps 32, 36. The hydraulic pump/motor assembly 40 can be switched between an operating mode in which it can be operated as a pump and an operating mode in which it can be operated as a motor. This assembly is also advantageously constructed as a swashplate assembly.

It is apparent from FIG. 1 that the hydraulic drive support unit 38 and the drive unit 26 are coupled, or can be coupled, parallel to each other via the gear arrangement 28 with the various hydraulic circuits 30, 34. Consequently, a direct torque exchange, for example, between the drive unit 26 and the hydraulic circuits 30, 34, as will be described in inure detail below and also a direct torque exchange between the hydraulic drive support unit 38 and the hydraulic circuits 30, 34 is possible.

The hydraulic drive support unit 38 further comprises a pressure fluid reservoir 42, which can be charged by operating the hydraulic pump/motor assembly 40 as a pump. To that end, the hydraulic pump/motor assembly 40 can convey fluid, e.g. hydraulic oil, from a preferably non-pressurized fluid reservoir 44 in the direction of the pressure fluid reservoir 42.

A charge/discharge valve unit 48 is provided in a line 46 leading from the hydraulic pump/motor assembly 40 to the pressure fluid reservoir 42. The charge/discharge valve unit 48 to be adjusted by electric excitation is pre-tensioned, for example by a pre-tensioned spring or the like to the basic state shown in FIG. 1 in which it interrupts the flow connection between the hydraulic pump/motor assembly 40 and the pressure fluid reservoir 42. The charge/discharge valve unit 48 can thereby be configured such that it functions as a nonreturn valve in this mode, allowing a fluid flow from the hydraulic pump/motor assembly 40 to the pressure fluid reservoir 42, but preventing a fluid flow in the reverse direction. By means of electrical excitation, for example, the charge discharge valve unit 48 is brought to its release mode, in which the flow connection between the pressure fluid reservoir 42 and the hydraulic pump/motor assembly 40 is released.

A line 52 leading to the fluid reservoir 44 branches off from the section 50 of the line 46 located between the pressure fluid reservoir 42 and the charge/discharge valve unit 48. This line 52 basically creates a connection between the pressure fluid reservoir 42 and the fluid reservoir 44. Three valve units 54, 56, 58 are arranged parallel to each other in the line 52. The valve unit 54 is, for example, an electrically excitable expansion valve unit 54 which is pre-tensioned to a basic state, for example, by spring pre-tensioning in which it releases the flow connection between the pressure fluid reservoir 42 and the fluid reservoir 44. Upon activation of the expansion valve unit 54, for example by means of electric excitation, it is switched to its mode in which it interrupts the flow connection between the pressure fluid reservoir 42 and the fluid reservoir 44. The expansion valve unit 54 can thereby be configured such that it functions as a non return valve, which basically allows a fluid flow from the fluid reservoir 44 in the direction of the pressure fluid reservoir 42, but interrupts a fluid flow in the opposite direction.

A manual expansion valve unit 56 is provided parallel to the expansion valve unit 54. By manual activation, it can be set to the mode in which it releases the flow connection between the pressure fluid reservoir 42 and the fluid reservoir 44.

An overload valve unit 58 is provided parallel to the valve units 54, 56 in the line 52. When the fluid pressure in the pressure fluid reservoir 42 or in the section 50 of the line 48 exceeds a predetermined pressure limit, said overload valve unit 58 allows a release of the pressure fluid reservoir 42 to the fluid reservoir 44. It can, for example, be provided that, at maximum charge in the pressure fluid reservoir 42, a fluid pressure of about 300 bar should prevail. In such a design, the overload valve unit 58 can be dimensioned such that at a pressure exceeding 300 bar in the pressure fluid reservoir 42, a flow connection is established between the pressure fluid reservoir 42 and the fluid reservoir 44 until the fluid pressure in the pressure fluid reservoir 42 again has fallen below this limit value.

The hydraulic drive support unit 38 further comprises a recirculation valve unit 60. This is provided in the flow path between the hydraulic pump/motor assembly 40 and the fluid reservoir 44 and branches off a section 62 of the line 46 located between the hydraulic pump motor assembly 40 and the charge/discharge valve unit 48. The recirculation valve unit 60 is basically pre-tensioned to a state in which there is a flow connection between the hydraulic pump/motor assembly 40 and the fluid reservoir 44. By means of electric excitation, for example, this recirculation valve unit 60 can be set to a mode in which this flow connection is interrupted. In this mode, the recirculation valve unit 60 can function as a nonreturn valve which stops a flow from the hydraulic pump/motor assembly 40 to the fluid reservoir 44 but releases a flow in the other direction.

The recirculation valve unit 60 can then be used to establish a flow connection between the hydraulic pump/motor assembly 40 and the fluid reservoir 44 with the charge/discharge valve unit 48 positioned in the closed mode when a fluid should recirculate from the fluid reservoir 44 and back into the fluid reservoir 44 without further charging the pressure fluid reservoir 42. This can be advantageous in order to maintain a minimum fluid flow through the hydraulic pump/motor assembly 40 in order to dissipate the heat generated in the area of this assembly.

Furthermore, an overload valve unit 64 is arranged parallel to the recirculation valve unit 60 which can be dimensioned such that in case of a pressure limit above the maximum charging pressure, for example in case of a pressure limit of about 300 bar, it releases a flow connection to the fluid reservoir 44 in order to prevent an excessive pressure build-up, especially in the area of the line 46.

In addition, a nonreturn valve 66 is provided parallel to the recirculation valve unit 60 and to the overload valve unit 64. This is switched such that it allows a flow from the fluid reservoir 44 into the line 46, especially into section 62 thereof but interrupts a flow in the other direction in order to prevent the a negative pressure in the area of the line 46.

In association with all valve units adjusting either by electrical excitation or by manual activation and releasing a flow path to the fluid reservoir 44, namely the expansion valve unit 54, the manual expansion valve unit 56 and the recirculation valve unit 60, flow restriction arrangements 68, 70, 72 are provided, which restrict the flow of fluid to the fluid reservoir 44, in particular when there are very big pressure differences between the pressure fluid reservoir 42 and the fluid reservoir 44.

There is no fluid exchange connection between the hydraulic drive support unit 38 and the hydraulic circuits 30, 34 required for operating the construction machine 10 in the drive system 10 described above. The hydraulic drive support unit 38 is exclusively drivingly, that is mechanically, coupled with the hydraulic circuits 30, 34, namely via the gear arrangement 28. This allows configuration of the hydraulic drive support unit 38 as an open circuit, namely a low-pressure circuit, while the hydraulic circuits 30, 34 can be configured as closed hydraulic circuits, namely as high-pressure circuits.

The drive system 10 shown in FIG. 1 can work in different operating modes. FIG. 1 shows a mode in which the hydraulic drive support unit 38 is switched to a recirculation operating mode to be described below. In the process, the pressure fluid reservoir 42 is not connected to the fluid reservoir 44, so that pressure, which may have built up therein, is basically maintained.

If the drive system 10 is to be operated, for example to move forward the soil compactor shown in FIG. 2 and so compact the subsoil 18 using vibratory and/or oscillation movements of the compactor roller 24, the charge/discharge valve unit 48 is excited so that so that it is in the mode in which it establishes a connection between the pressure fluid reservoir 42 and the hydraulic pump/motor assembly 40. At the same time, the expansion valve unit 54 and the recirculation valve unit 60 are controlled or excited in order set them to their closed position. In this mode, the drive unit 26 can drive the two hydraulic pumps 32, 36 via the gear arrangement 28 for the driving operation and drive the imbalance mass arrangement. Furthermore, the hydraulic pump/motor assembly 40 is driven so that, operating as a pump, it conveys fluid from the fluid reservoir 44 to the pressure fluid reservoir 42. This mode can be maintained until the pressure fluid reservoir 42 reaches a threshold charge which, for example, can be 85% of the maximum charge. At a maximum charge pressure of about 300 bar, this threshold charge can correspond to a charge pressure of about 255 bar.

If this state is reached, the hydraulic pump/motor assembly 44 can still be further operated in the pump mode, albeit at a reduced output in order to compensate for any possible leakage losses from the pressure fluid reservoir 42 via the valve units closing, in particular, in the direction of the fluid reservoir 44 and to ensure that pressure is maintained that approximately corresponds to the threshold charge.

If energy is released during the operation of the construction machine 12, for example because it is to be stalled or the operation of the imbalance mass arrangement is to be stopped, the torque transmission direction is reversed in the hydraulic circuits 30, 34 so that the hydraulic pumps 32, 36 are temporarily driven by a fluid flow generated by the respective hydraulic motors, which are not shown, and apply a torque to the gear arrangement 28. This torque can be applied via the gear arrangement 28 to the hydraulic pump/motor assembly 40, which then again can be used as a pump in order to further increase the pressure in the pressure fluid reservoir 42, for example, until it reaches the maximum charging pressure. To that end, the hydraulic pump/motor assembly 40 is set to an increased output rate so that the required or desired pressure build-up is reached in the pressure fluid reservoir 42. This process can be continued or repeated until the maximum charge of the pressure fluid reservoir 42, that is the maximum charging pressure of for example 300 bar, has been reached. If this is the case, the hydraulic pump/motor assembly 40 can again be set to a mode with a lower output rate, in order to ensure that an increased pressure is maintained at the maximum charge pressure in the pressure fluid reservoir 42 by using at least one energy recovery procedure.

It should be pointed out that this energy recovery procedure can also be used for further charging the pressure fluid reservoir 42 when the recovery of energy is possible from only one of the two hydraulic circuits 30, 34. In addition, the drive unit 26 can also be used in this mode in order to apply additional torque to the gear arrangement 28, in particular when a transition to an energy recovery operation is possible, but the pressure fluid reservoir 42 has, at the same time, not yet reached the threshold charge of for example, about 85% of the maximum charge.

It is especially advantageous that a direct connection between the hydraulic circuits 30, 34 and the hydraulic drive support unit 38 exists via the gear arrangement 28 during an energy recovery operation, so that the energy released in the energy recovery operation can be guided, for example, via the drive unit 26 in the direction of the hydraulic drive support unit 38.

If there is a high torque request in the area of one or both hydraulic circuits 30, 34, for example, because the construction machine 12 is to overcome a comparatively high incline for a short time or is to be moved over a curbstone or other impediment, the energy stored in the pressure fluid reservoir 42 can be used in order to apply a drive support torque to the gear arrangement 28 during the operation of the hydraulic pump/motor 40 as a motor and to guide it via the gear arrangement 28 to one or both hydraulic circuits 30, 40, namely as a drive support of the respective hydraulic pumps 32 or 36. In this mode, the drive unit 26, for example, can be operated such that it can supply the maximum drive torque it can provide, so that a total drive torque is guided via the gear arrangement 28 to the hydraulic circuits 30, 34, which is composed of the drive torque of the drive unit 26, for example, the same maximum drive torque, and the drive support torque of the hydraulic drive support unit 38. In order to reach this state, the charge/discharge valve unit 48 is switched to its release mode, so that the pressure fluid reservoir 42 can be emptied via the hydraulic pump/motor assembly 40 in the direction of the fluid reservoir 44. The torque that can be provided in this drive support operating mode by the hydraulic drive support unit 38 can be varied by a corresponding adjustment of the hydraulic pump/motor assembly 40 while the motor is operated.

A mode in which the hydraulic pump/motor assembly 40 can be operated in a recirculation operating mode can occur, when, for example, the speed of the drive unit 26 falls below a threshold speed because the drive lever is moved to a neutral position, which, under normal working conditions, it does not, or should not, fall below in order to provide a sufficient drive torque. For example, such a threshold speed can be in the range from 1000 to 1200 revolutions per minute, advantageously at about 1100 revolutions per minute. In such a mode, the drive unit can, for example, transition into an idle mode, in which it rotates at a speed, for example, in the range of 950 revolutions per minute. Since it must be assumed that the drive system 10 should not be used in this mode to provide the comparatively high torques generally required in the working mode or driving mode, continuously charging the pressure fluid reservoir 42 to maintain a comparatively high reservoir pressure can be omitted. It can, for example, be provided that when the charge state of the pressure fluid reservoir is above a threshold charge, for example in the range of 60 to 80%, preferentially about 70% of a maximum charge, the continuous operation of the hydraulic pump/motor assembly 40 for maintaining the very high fluid pressure in the pressure fluid reservoir 42 can be stopped and changed over to mode in which the hydraulic pump/motor assembly 40 still driven by the drive unit 26 is only operated to recirculate the fluid out of the fluid reservoir 44 and back into the fluid reservoir 44. If, as described above, it is provided that there is a maximum charge in the pressure fluid reservoir 42 when the pressure prevailing therein is at about 300 bar, then the threshold charge or the pressure in the pressure fluid reservoir 42 provided in association therewith to transition to the recirculation operating mode is at about 210 bar. A flow circuit designated with arrows in FIG. 1 is thus established in which the conveyed fluid quantity is sufficient to dissipate the heat generated in the area of the hydraulic pump/motor assembly 40, but, at the same time, there is only a comparatively small load on the drive unit 26 to make available such a drive torque for the hydraulic pump/motor assembly 40. This reduces the load on the drive unit 26 and thus its fuel consumption. In this recirculation operating mode, the charge/discharge valve unit 48 and also the expansion valve unit 54 as well as the manual expansion valve unit 56 are in their closed mode in order to maintain the charge state of the pressure fluid reservoir 42. The fluid removed from the fluid reservoir 44 by the hydraulic pump/motor assembly 40 can be conveyed back to the fluid reservoir 44 via the recirculation valve unit 60 switched to its release position.

If the drive system 10 is in its recirculation operating mode, and a higher drive torque is again required of the drive unit 26 owing to the activation of an accelerator pedal or the activation of a hydraulic working circuit 34, in general there is again a transition to a mode in which the drive system 10 is to be operated in order to provide a comparatively large torque, the recirculation operating mode can be ended in that the recirculation valve unit 60 is, for example, again switched to its closed position by electrical excitation, and the charge/discharge valve unit 48 is switched to its release mode in order to again operate the hydraulic pump/motor assembly 40 as a pump to charge or further charging the pressure fluid reservoir 42.

The transition to the recirculation operating mode in a phase in which a larger torque request is not to be expected also enables the reduction of the anyway present supply losses by the reduction of the torque request on the side of the hydraulic pump/motor assembly 40, for which purpose only the recirculation valve arrangement 60 is to be switched to the mode shown in FIG. 1 namely, for example, a mode in which it is already pre-tensioned, and the hydraulic pump/motor assembly 40 is to be operated as a pump with a comparatively low output. If one of the conditions, [namely the] speed threshold is fallen short of, and [the] threshold pressure is exceeded, are not met, the charge of the pressure fluid reservoir 42 is below the threshold charge provided for the transition to the recirculation operating mode, the hydraulic pump/motor assembly 40 can also be operated for further charging the pressure fluid reservoir 42, when the speed of the drive unit falls below the threshold speed provided in association with the recirculation operating mode.

The embodiment of the drive system 10 allows to design the drive unit 26 with respect to the maximum drive, torque it can provide, so that this maximum drive torque is smaller than a maximum torque request during the operation of the construction machine 12. Since in states in which such a torque is requested, the hydraulic drive support unit 38 can provide the drive support torque, it is possible to apply a total drive torque to the hydraulic circuits 30, 34 which corresponds to the requested torque in order to operate the construction machine 12 in a convenient manner.

As a result of this design of the drive unit 26 with a comparatively low maximum drive torque, an efficient use of the energy is guaranteed owing to the overall smaller size, allowing, in particular, use of the released energy in various modes of the construction machine 12 in order to charge the pressure fluid reservoir 42.

It should be pointed out that the drive system shown in FIG. 1 can be varied in many different ways, in particular, with respect to the design of the hydraulic drive support unit. Thus, for example, several pressure fluid reservoirs connected in parallel could, of course, be provided. The various valves or valve units can also be provided as separate assemblies connected to each other by means of lines, or integrated into a valve block, which contributes to a compact embodiment, which nevertheless operates with a high operational safety.

Furthermore, the various hydraulic pumps as well as the hydraulic pump/motor assemblies can, for example, be permanently coupled with the gear arrangement 28, that is, not coupled via coupling arrangements or the like interrupting the torque flow. By an adjustment of these pumps or pump groups configured, for example, as swash plate units, the torque request and fluid flow rates or output can be varied. If a respective hydraulic circuit or the hydraulic drive support unit is not to be operated, the hydraulic, pumps or the hydraulic pump/motor assemblies can be switched to a neutral position.

The principle of providing a recirculation operating mode described in detail above can be combined in an especially advantageous manner with the embodiment principle according to which a maximum drive torque that can be provided by the drive unit is smaller than a maximum torque request to be applied to the operation of at least one hydraulic circuit. Since this design in general results in the use of smaller drive units, namely smaller diesel combustion engines, the load relief thereof is especially advantageous when providing the recirculation operating mode.

The invention claimed is:

1. A self-propelled construction machine having a drive system, said drive system comprising:
   a drive unit;
   at least one hydraulic circuit with a hydraulic pump driven by the drive unit,
   a hydraulic drive support unit with a hydraulic pump/motor assembly and at least one pressure fluid reservoir, wherein the hydraulic pump/motor assembly is, or can be, drivingly coupled with the drive unit or/and at least one of the at least one hydraulic circuit, wherein the hydraulic pump/motor assembly can be driven in a charge operating mode by the drive unit and at least one of the at least one hydraulic circuit as a pump to charge at least one of the at least one pressure fluid reservoir to a maximum charge and can be operated in a drive support operating mode as a motor to provide a drive support torque for the hydraulic pump of at least one of the at least one hydraulic circuit;
   at least one fluid reservoir;
   wherein the hydraulic pump/motor assembly can be operated in a recirculation operating mode as a pump to convey fluid out of a fluid reservoir of the at least one fluid reservoir and into the same, or another fluid reservoir of the at least one fluid reservoir;
   wherein the hydraulic pump/motor assembly is operated to provide the recirculation operating mode when the charging mode of at least one of the at least one pressure fluid reservoir is above a threshold charge below said maximum charge and a drive speed of the drive unit is below a threshold speed.

2. The construction machine according to claim 1, wherein the hydraulic pump/motor assembly is driven in the circulation operating mode by the drive unit.

3. The construction machine according to claim 1, wherein the threshold charge is a charging mode with a charge in the range of 60 to 80% of a maximum charge of the at least one pressure reservoir, or/and that the threshold speed is a speed in the range of 1000 to 1200 rpms.

4. The construction machine according to claim 1, wherein the hydraulic drive support unit comprises a charge/discharge valve unit for the selective release/interruption of a flow connection between the hydraulic pump/motor assembly and the at least one pressure fluid reservoir, at least in the flow direction from the at least one pressure fluid reservoir to the hydraulic pump/motor assembly and comprises an expansion valve unit to selectively release/interrupt a flow connection between the at least one pressure fluid reservoir and the fluid reservoir at least in the flow direction from the pressure fluid reservoir to the fluid reservoir.

5. The construction machine according to claim 4, wherein the charge/discharge valve unit is pre-tensioned to a basic state interrupting the flow connection, or/and that the expansion valve unit is pre-tensioned to a basic state releasing the flow connection.

6. The construction machine according to claim 1, wherein the hydraulic drive support unit comprises a recirculation valve unit in the flow path between the hydraulic pump/motor assembly and a fluid reservoir of the at least one fluid reservoir to selectively release/interrupt a flow connection between the hydraulic pump/motor assembly and the fluid reservoir of the at least one fluid reservoir at least in the flow direction from the hydraulic pump/motor assembly to the fluid reservoir of the at least one fluid reservoir.

7. The construction machine according to claim 6, wherein a flow restriction arrangement is provided in the flow path between the hydraulic pump/motor assembly and the fluid reservoir of the at least one fluid reservoir.

8. The construction machine according to claim 6, wherein the recirculation valve unit is pre-tensioned to a basic state releasing the flow connection between the hydraulic pump/motor assembly and the fluid reservoir of the at least one fluid reservoir.

9. The construction machine according to claim 6, wherein a flow restriction arrangement is provided in the flow path between the hydraulic pump/motor assembly and the recirculation valve unit.

10. The construction machine according to claim 1, wherein the hydraulic drive support unit comprises an open circuit.

11. The construction machine according to claim 1, wherein there is no fluid exchange connection between at least one hydraulic circuit and the hydraulic drive support unit.

12. The construction machine according to claim 1, wherein the drive unit comprises a diesel combustion engine.

13. The construction machine according to claim 1, wherein the threshold charge is a charging mode with a charge in the range of 60 to 80% of a maximum charge of the at least one pressure reservoir, or/and that the threshold speed is a speed in the range of 1100 rpms.

14. The construction machine according to claim 1, wherein the threshold charge is a charging mode with about 70% of a maximum charge of the at least one pressure reservoir, or/and that the threshold speed is a speed in the range of 1000 to 1200 rpms.

15. The construction machine according to claim 1, wherein there is no fluid exchange connection between each hydraulic circuit and the hydraulic drive support unit.

16. A method of operating a self-propelled construction machine having a drive system, the drive system comprising:

a drive unit;
at least one hydraulic circuit with a hydraulic pump driven by the drive unit;
a hydraulic-drive support unit with a hydraulic pump/motor assembly and at least one pressure fluid reservoir;
at least one fluid reservoir;
wherein the hydraulic pump/motor assembly is, or can be, drivingly coupled with the drive unit or/and at least one hydraulic circuit;
wherein the hydraulic pump/motor assembly can be operated in a charging operating mode by the drive unit and at least one of the at least one hydraulic circuit as a pump to charge at least one of the at least one pressure fluid reservoir to a maximum charge and be operated in a drive support operating mode as a motor to provide a drive support torque for the hydraulic pump of at least one of the at least one hydraulic circuit, in which procedure the hydraulic pump/motor assembly can be operated in a recirculation operating mode as a pump to convey fluid out of a fluid reservoir of the at least one fluid reservoir and into the same or another fluid reservoir of the at least one fluid reservoir;
wherein the hydraulic pump/motor assembly is operated in the recirculation operating mode when a charge state of at least one pressure fluid reservoir of the at least one pressure fluid reservoir is above a predetermined threshold charge and below said maximum charge and a speed of the drive unit is below a predetermined threshold speed.

17. The method according to claim 16,
wherein the hydraulic pump/motor assembly is operated for a predetermined time after falling below the threshold speed to provide the recirculation operating mode when the charge state of at least one of the at least one pressure reservoir is above a predetermined threshold charge.

\* \* \* \* \*